United States Patent [19]
Edwards et al.

[11] Patent Number: 5,862,958
[45] Date of Patent: Jan. 26, 1999

[54] BOTTLE TOP DISPENSER

[75] Inventors: James R. Edwards, Dubuque; Chester E. Chomka, Bellevue, both of Iowa

[73] Assignee: Barnstead/Thermolyne Corporation, Dubuque, Iowa

[21] Appl. No.: 828,262

[22] Filed: Mar. 21, 1997

[51] Int. Cl.[6] .................................................. B65D 88/54
[52] U.S. Cl. ...................... 222/309; 222/318; 222/383.1
[58] Field of Search ................................ 222/383.1, 384, 222/309, 318

[56] References Cited

U.S. PATENT DOCUMENTS

| | | |
|---|---|---|
| Re. 28,970 | 9/1976 | Shapiro . |
| 551,630 | 3/1895 | McGlasilan et al. . |
| 2,978,149 | 4/1961 | Rosen . |
| 3,006,505 | 10/1961 | Levin . |
| 3,143,252 | 8/1964 | Shapiro . |
| 3,653,556 | 4/1972 | Moran et al. . |
| 3,838,793 | 10/1974 | Rochette . |
| 3,863,807 | 2/1975 | Shapiro et al. . |
| 4,003,499 | 1/1977 | Shapiro et al. . |
| 4,072,247 | 2/1978 | Yamazaki . |
| 4,074,831 | 2/1978 | Roach . |
| 4,081,111 | 3/1978 | Sandow . |
| 4,306,670 | 12/1981 | Oshikubo . |
| 4,358,027 | 11/1982 | Poitras . |
| 4,449,650 | 5/1984 | Sawatzki . |
| 4,667,691 | 5/1987 | Sasa . |
| 5,141,137 | 8/1992 | Knodel . |

FOREIGN PATENT DOCUMENTS

| | | |
|---|---|---|
| 0222609 A2 | 5/1987 | European Pat. Off. . |
| 0269496 A2 | 6/1988 | European Pat. Off. . |
| 0448394 A2 | 9/1991 | European Pat. Off. . |
| 0542241 A2 | 5/1993 | European Pat. Off. . |
| 1022414 | 3/1953 | France . |
| 475096 | 4/1929 | Germany . |
| 2343687 | 3/1975 | Germany . |
| 4137353 A1 | 5/1993 | Germany . |

OTHER PUBLICATIONS

Instructions and Parts List of Barnstead / Thermolyne Corporation dated Nov. 22, 1995 for "Complete REPIPET® JR. Calibratable Fixed Volume Dispenser".

*Primary Examiner*—Gregory L. Huson
*Attorney, Agent, or Firm*—Wood, Herron & Evans, L.L.P.

[57] ABSTRACT

A dispenser (20), including a plunger (24) and cylinder (26) connected to a dispenser body (28), a flow control valve (54) is rotatably mounted in the dispenser body (28) and has a valve fluid path (92, 106, 108) connected between the cylinder (26) and a control valve outlet (109). Advancing the plunger (24) when the valve (54) is in a first, recirculate position pushes liquid from the cylinder (26), through a return path (112) and back into the bottle (22). Advancing the plunger (24) when the flow control valve (54) is in a second, dispense position delivers liquid from the cylinder (26) out through a dispensing orifice (120).

23 Claims, 3 Drawing Sheets

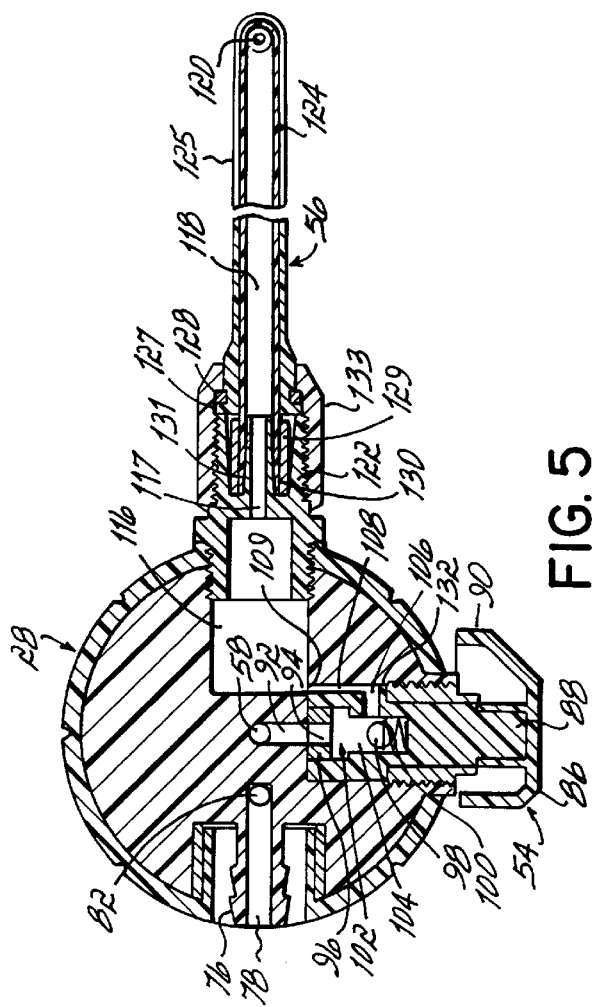
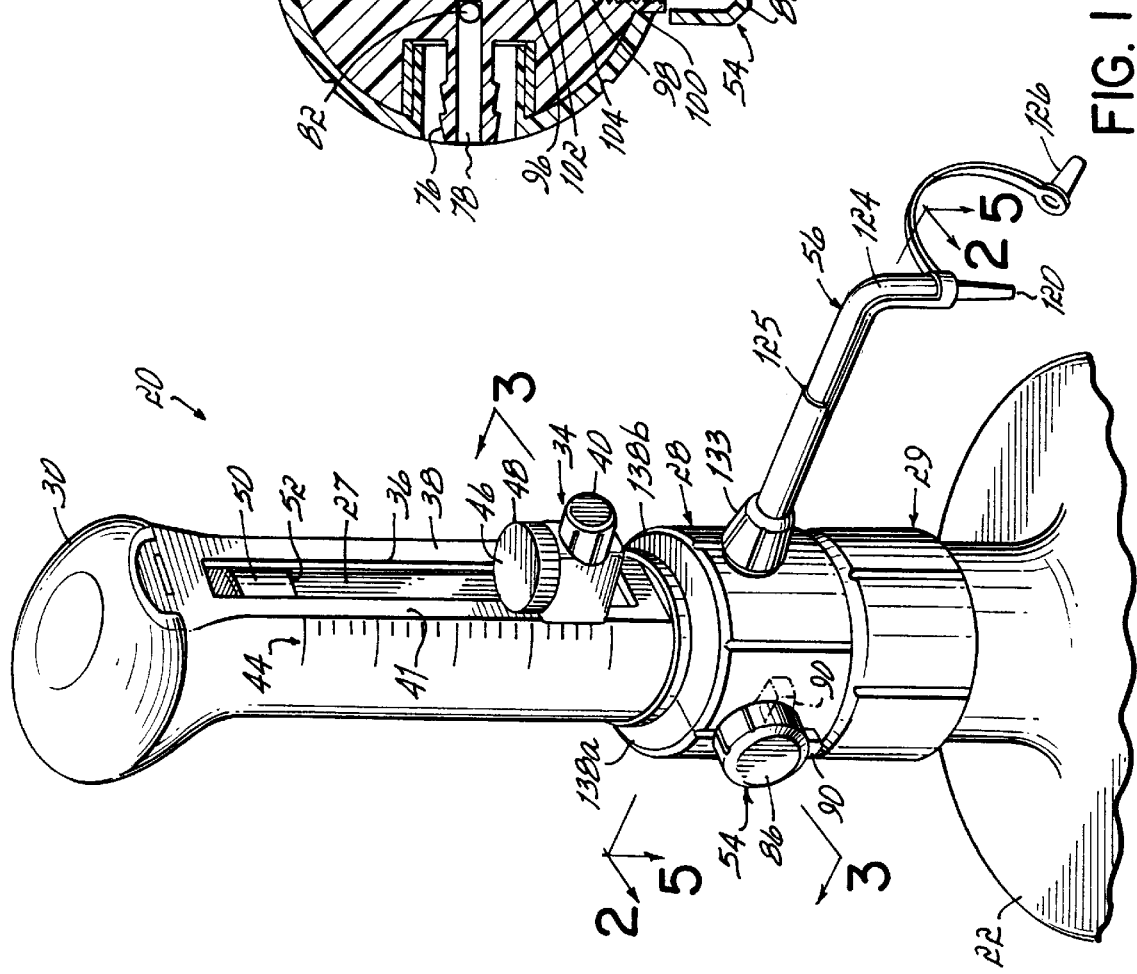
FIG. 5
FIG. 1

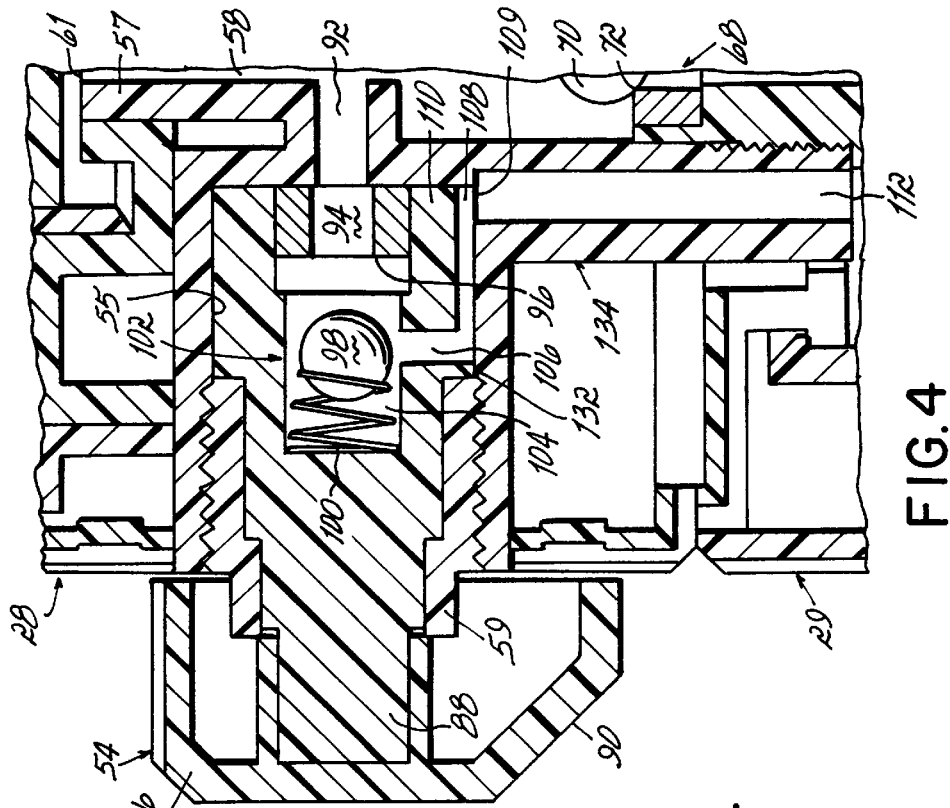
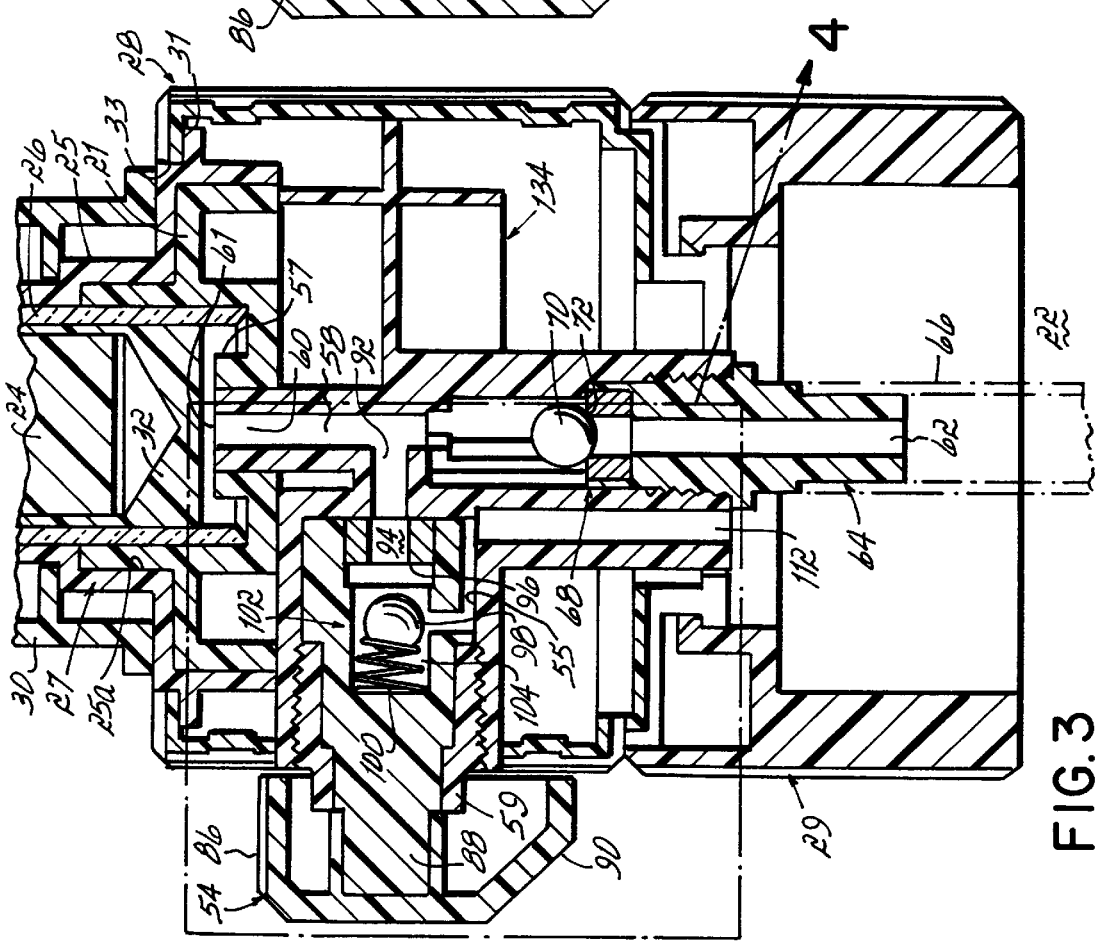
FIG. 4
FIG. 3

BOTTLE TOP DISPENSER

FIELD OF THE INVENTION

This invention relates generally to a liquid dispensing device and more particularly, to a liquid dispensing device adapted to be mounted on the top of a liquid container.

BACKGROUND OF THE INVENTION

There are many applications where it is necessary to repeatedly dispense a metered or measured quantity of liquid from a bottle, generally, the bottle in which the liquid is received from a supplier. Further, bottle top dispensers of different designs have been known for many years for servicing those applications. Typically, such dispensers utilize a plunger and cylinder mounted on top of the bottle. Often such dispensers have two check valves, a fill check valve and a dispense check valve. When the plunger is withdrawn, the fill check valve permits liquid to flow from the container into the cylinder, and the dispense check valve prevents the liquid from flowing out of the dispenser. However, we the plunger is advanced, the dispense check valve permits the liquid to flow from the cylinder to a dispensing orifice; and the fill check valve prevents the liquid from re-entering the container. The plunger often has an adjustable stop such that withdrawal of the plunger to the stop position pulls a desired volume of liquid from the bottle into the cylinder; and a subsequent advancement of the plunger in the cylinder pushes the desired volume of liquid out through the dispensing orifice.

In many applications the liquid being dispensed may be a chemical reagent, or corrosive, or toxic and/or a very expensive liquid. In those applications, it is desirable to minimize unnecessary dispensing of the liquid, for example, as often occurs when initially purging air from the dispenser. To prevent accidental or unnecessary dispensing of the liquid, U.S. Pat. No. 4,306,670 discloses a flexible tube attached to the dispensing tip, the end of which may be inserted in a hole in the dispenser housing, thereby recirculating the liquid. However, the flexible tube itself presents a potential for an accidental leakage of liquid therefrom and therefore, must be handled with extreme care and caution.

Another bottle top dispenser with a recirculation capability is disclosed in the European Patent Publication No. 542 241 A2. In that publication, the fill and dispense check valves are mounted in the dispenser body; and a recirculation valve is mounted in the dispensing spout or tip. Generally, the recirculation valve is rotatable between two positions, a first position permits liquid to be dispensed from the tip and, a second position causes the liquid to be recirculated through the spout, through the dispenser body and back into the bottle. In each of the several embodiments disclosed, the recirculation valve is designed to have separate dispense and recirculate paths there through depending on the valve position. The above design has several disadvantages. First, mounting the recirculation valve in the dispensing tip requires that dispenser tip be large and bulky. Such a design not only adds costs but may not be as pleasing in appearance as the more traditional sleeker, thinner dispenser tip designs. Second, by requiring separate dispense and recirculate paths through the recirculation valve substantially increases the complexity and cost of the recirculation valve.

Therefore, there continues to be a need to provide a bottle top dispenser providing selectable dispensing and recirculation capabilities that is compact, simple in design, easy to use, and less expensive to manufacture.

SUMMARY OF THE INVENTION

The present invention provides a bottle top dispenser that has a manually operable control valve that selectively provides either a dispensing mode or a recirculation mode for the liquid in the bottle. The dispenser is especially useful for dispensing corrosive, toxic, expensive or other liquids from a bottle where it is important to minimize or eliminate any accidental or unnecessary dispensing of the liquid.

According to the principles of the present invention and in accordance with the described embodiments, the dispenser includes a dispenser body having a dispensing path connected to a dispensing orifice and a recirculation path connected to the container. The dispenser body includes a plunger and cylinder such that retracting the plunger in the cylinder pulls liquid from the container into one end of the cylinder. The dispenser further includes a control valve mounted within the dispenser and having a fluid path connected between the one end of the cylinder and a control valve outlet. When the control valve is moved to a first position, advancing the plunger in the cylinder pushes the liquid from the cylinder through the dispensing fluid path and out the orifice. When the control valve is moved to a second position, advancing the plunger in the cylinder recirculates the liquid through the dispenser and back into the container. The flow control valve also has a check valve located therein for permitting the liquid to flow from the one end of the cylinder to the control valve outlet, but preventing the flow of liquid from the control valve outlet back into the cylinder.

The above construction provides a bottle top liquid dispenser that is compact and simple in design, easy to use and less expensive to manufacture. In addition, the recirculate position of the flow control valve prevents liquid from being dispensed during the air purge cycle. Further, if for any reason, after liquid has been pumped into the cylinder, the liquid is not to be dispensed, the recirculate position of the control valve allows the liquid to be returned directly back into the bottle. In addition, when not in use, maintaining the flow control valve in its recirculate position eliminates the potential for an inadvertent or accidental dispensing of the liquid. These and other objects and advantages of the present invention will become more readily apparent during the following detailed description taken in conjunction with the drawings herein.

BRIEF DESCRIPTION OF THE DRAWINGS

FIG. 1 is a perspective view illustrating a bottle top dispenser in accordance with the principles of the present invention.

FIG. 3 is a cross section view taken along line 3—3 of FIG. 1 illustrating the flow control valve in the recirculate position.

FIG. 4 is an enlarged view of the flow control valve in the recirculate position.

FIG. 5 is a cross section view taken along line 5—5 of FIG. 1 and with the flow control valve rotated to the dispense position.

DETAILED DESCRIPTION OF THE INVENTION

Figure 2:
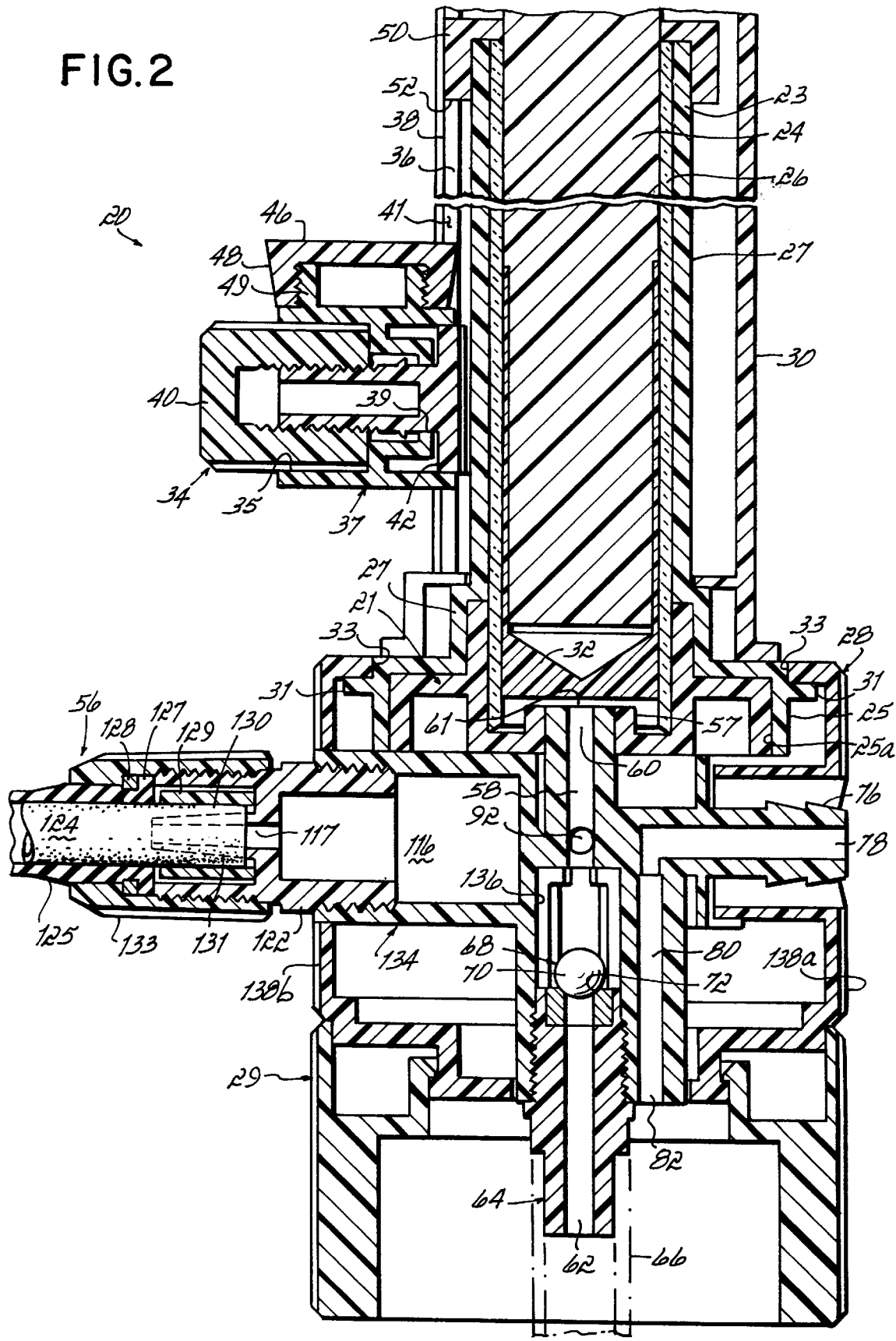
FIG. 2 is a cross section view taken along line 2—2 of FIG. 1.

Referring to FIGS. 1 and 2, a bottle top dispenser 20 is shown attached to the top of a bottle 22. The dispenser includes a piston or plunger 24 slidably mounted inside a glass cylinder or tube 26 that, in turn, has a lower end press fit and/or bonded to a tube adapter 21. The tube 26 forms a liquid-tight seal with the tube adapter 21. The diameter of the cylinder 26 is sized to fit snugly into an upper end 23 of a protective tube 27. The protective tube 27 steps to larger diameters at its lower end 25 which includes bores 25a into which the tube adapter 21 is press fit and/or bonded. The lower end 25 of the protective tube 27 further includes a flange 31 around its outer diameter, and that outer diameter is press fit and/or bonded into a bore 33 of a dispenser body or housing 28. The body 28 is rotatably connected to a swivel base 29, so that the body can rotate 360° with respect to the swivel base 29. The swivel base 29 is mounted to the top of the bottle 22 with a threaded connection, clamps or other known means. Further, as is known, the swivel may include inserts having different size threads to permit the dispenser 20 to be mounted to different bottles having different tops. The plunger 24 has an upper end (not shown) connected to the inside of the upper end of the handle 30 (FIG. 1). A plunger seal 32 is mounted on and movable with the lower end of the plunger 24 and provides a liquid-tight seal between the plunger seal 32 and the inside wall of the glass cylinder 26.

A volume adjust control 34 is slidably mounted within a vertical slot 36 in a flat side 38 of the handle 30. A course adjustment knob 40 is slidably mounted into a bore 35 in one side of a control body 37. The knob 40 is threadedly connected to one end of a clamp member 42 extending through a central bore 39 of the control body 37. The other end of the clamp member 42 has lateral edges (not shown) that extend behind, that is, extend over inner directed surfaces of, side edges 41 (FIG. 1) of the slot 36. Therefore when the coarse adjustment knob 40 is loosened, the volume adjust control 34 including the control body 37, the knob 40 and clamp member 42, slide freely within the slot 36. A graduated scale 44 on the handle 30 is used to select the desired volume of liquid to be dispensed from the bottle 22. The volume adjust control 34 is moved along the slot 36 until an upper surface 46 of a fine adjustment knob 48 is aligned with respect to the desired graduation on the scale 44. The course adjustment knob 40 is then tightened which, in turn, tightens the clamp 42 against rear surfaces of the sides 41 of the slot 36, thereby locking the volume adjust control 34 at its desired location with respect to the graduated scale 44. If desired, the fine adjustment knob 48 threaded on a vertical shaft 49 on the control body 37 may be twisted to slightly move the upper surface 46 of the knob 48 either up or down for a fine adjustment of the desired volume.

Raising the handle 30 retracts the plunger 24 upwardly within the cylinder 26 and, in addition, moves the volume adjust control 34 upward in the slot 36. The handle 30 is raised until the upper surface 46 contacts the lower edge 52 of the stop collar 50 at that point. As will be subsequently further described, as the handle 30 is raised, the desired volume of liquid is pulled from the bottle 22 into the volume of the cylinder 26 vacated by the retracting plunger 24. Thereafter, depressing on the handle 30, which advances the plunger 24 downwardly within the sleeve 26, will, depending on the position of the flow control valve 54, either dispense the liquid through the dispensing spout or tip 56 or recirculate the liquid back into the bottle 22. As will be subsequently described, is the control valve 54 is pointing down as illustrated in FIG. 1, depressing the plunger will recirculate the liquid back into the bottle 22. However, if the control valve 54 is rotated to point to the dispensing tip 56 as illustrated in FIG. 5, depressing the plunger will dispense the liquid through the dispensing tip 56.

As shown in FIG. 2, the dispenser body 28 has a centrally located shaft portion 57 extending slightly into the lower end of the glass cylinder 26. The dispenser body 28 further includes a main fluid path 58 having an upper end 60 in fluid communication with an inlet/outlet 61 at the lower end of the glass cylinder 26. The lower end 62 of the main fluid path 58 extends through a suction fitting 64 which has an upper end threaded into the dispenser body 28. A lower end of the suction fitting 64 is connected by a friction fit and/or bonded into one end of a fill tube 66. The other end of the fill tube 66 (not shown) extends down close to the bottom of the bottle 22.

The main fluid path 58 also extends through an annular ball seat 72 that is press fit and/or bonded into a bore in the upper end of the fitting 64 and forms part of a first or suction check valve 68. The check valve 68 includes a check ball 70 which mates with the ball seat 72 to provide a liquid-tight seal there between. Preferably, gravity holds the ball 70 against the seat 72 as is shown in FIG. 2 in the absence of a pressure differential across the check valve 68 tending to move the ball 70 upwardly. Retraction of the plunger 24 reduces the pressure above the ball 70 and creates a pressure differential across the check valve 68 that is effective to raise the check ball 70 above the ball seat 72, thereby permitting liquid to flow from the bottle 22, through the fill tube 66, along the main fluid path 58 and into the lower end of the cylinder 26. In contrast, advancing the plunger 24 downwardly within the cylinder 26 increases the pressure above the ball 70 which forces the check ball 70 against the ball seat 72, thereby prohibiting liquid from flowing through the check valve 68 and back into the container 22.

A tube fitting 76 extending laterally from the dispenser body 28 has a central bore 78 extending there through that has one end intersecting one end of a fluid passage 80. The other end 82 of the fluid passage 80 extends through the body 28 and opens into the interior volume of the swivel base 29. Therefore air enters the bottle 22 through the central bore 78 and the fluid passage 80 to replace the liquid being removed. As is known, in some applications, one end of a tube (not shown) may be connected to the fitting 76, and the other end of the tube is connected to a desiccant, filter or other device for conditioning the ambient air prior to entering the bottle 22.

Referring to FIGS. 3 and 4, the flow control valve 54 is rotatably mounted within a generally radial bore 55 of the body 28 and is held in place by a threaded nut or bushing 59. The control valve 54 includes a knob 86 mounted on the end of a valve stem or body 88. The knob 86 also includes a pointer 90 which preferably identifies the direction of liquid flow through the dispenser 20. For example, as illustrated in FIGS. 1,3 and 4, with the pointer 90 pointing down towards the bottle 22, the flow control valve 54 is designed to recirculate the liquid back into the bottle 22 in response to the advancement of the plunger 24 within the cylinder 26. The liquid flows from the bottom of the cylinder 26, through the upper section 60 of the main fluid path 58 into the flow control valve 54 by means of a first fluid path 92 that has one end connected to the main fluid path 58. The other end of the fluid path 92 connects with a fluid path 94 which is preferably centrally and axially located with respect to the rotatable body 88 of the flow control valve 54. The fluid path 94 has one end extending through a ball seat 96 which mates with a check ball 98. The ball seat 96, check ball 98 and compression spring 100 function as a check valve 102. When the plunger 24 is depressed, the liquid pressure in fluid paths 92, 94 forces the ball 98 away from the seat 96 as is illustrated in FIGS. 3 and 4. In that state, the check valve 102 permits liquid to flow along the fluid paths 58, 92, 94 and into a cavity 104 within the valve body 88 in response to the plunger 24 being advanced within the cylinder 26. However, when the plunger 24 is retracted, the pressure differential across the check valve 102 permits the compression spring 100 to push the check ball 98 against the ball seat 96 thereby prohibiting liquid in the fluid paths 92,94 from entering the cavity 104 and recirculating back into the bottle 22. In the presence of no or a small increase in pressure in the fluid path 94, the compression spring 100 holds the ball 98 against the seat 94.

With the pointer 90 in the position shown in FIGS. 3 and 4, assuming the plunger 24 is being depressed and is moving downwardly, the pressure in paths 92, 94 creates a force on the ball 98 which overcomes the bias force of the spring 100 and causes the ball 98 to move away from the ball seat 96. The greater fluid pressure in the upper end 60 of fluid path 58 also causes ball 70 to seat against the ball seat 72. Therefore, with check valve 68 closed and check valve 102 open, liquid in fluid paths 92, 94 flows into the cavity 104. The liquid then passes through a fluid path 106 that is preferably radially located with respect to a center line of the generally cylindrical valve body 88. The outer end of the fluid path 106 intersects one end of a fluid path 108 that extends along the outer surface of the valve body 88 in a generally axial direction back toward an outlet 109 of the flow control valve 54. The fluid path 108 is preferably created by cutting a horizontal, axially directed slot in the outer surface of the valve body 88 from an inner end 110 of the valve body 88 to a fluid passage 106. The fluid path may also be created by cutting a chord across the valve body 88 to create a flat surface. Preferably, the fluid path 108 is aligned with the pointer 90 on the knob 86. The flow control valve outlet 109 intersects a return path 112 that extends through the dispenser body 28 axially with respect to the center line of the dispenser 20. The return path 112 opens up at its other end into the interior of the swivel base 29 and therefore, is in fluid communication with the interior of the bottle 22. Consequently, with the flow control valve 54 in the position illustrated in FIGS. 1, 3 and 4, advancement of the plunger 24 within the cylinder 26 will push the liquid along a recirculation path under pressure through the flow paths 58, 92, 94 past open check valve 102 into cavity 104 and through fluid paths 106, 108, 112, thereby recirculating the liquid back into the bottle.

Referring to FIGS. 2 and 5, the dispensing tip 56 includes a fitting 122 having one end threadedly connected to one side of the dispenser body 28. A generally L-shaped tube section or tip 124 has an outer, shorter leg extending downwardly and terminating with the orifice 120. The tube section 124 is fitted inside a hollow L-shaped holder 125. The distal end of the holder 125 has a cap 126 tethered thereto which is sized to fit over the distal end of the tip 124 and provide a drip seal over the orifice 120. The inner end of the holder 125 is flared to form a collet that is split into four sections that terminate with a mounting flange 127. Small teeth or projections (not shown) are disposed in a ring on an inside surface of the collet. A retainer washer 128 is sized to slide over the collet such that the four collet sections are forced slightly inward, thereby forcing the ring of teeth into an outer surface of the tube 124. A cylindrical locating and locking collar 129 slides over the inner end 130 of the tip 124 which in turn slides over a flared hollow shaft portion 131 extending from an outer directed end of the fitting 122. As nut 133 is threaded over the fitting 122, collar 129 locates the tube 124 with respect to the fitting 122. The translating nut 133 pulls the flange 127, and the moving flange 127 pushes the inner end 130 of the tube 124 over the flared portion 131 of the fitting 122. The inner end 130 of the tube 124 is squeezed between the flared portion 131 and the inside surface of the collar 129, thereby forming a liquid seal there between.

The above assembly is normally used with a plastic dispenser. If the dispenser is glass, the above assembly will vary slightly to accommodate the rigid glass material. For example, the flared portion 131 is not used and the seal is created by squeezing the collar 129 on the outer surface of the tube 124. Referring to FIG. 1, the holder 125 is opened at its outer end to expose the tube 124. That open construction facilitates the assembly of the tube 124 into the holder 125.

The flow control valve has a second, dispense position illustrated in phantom in FIG. 1 and in FIG. 5 in which the pointer 90 is pointing toward the dispensing tip 56. The dispense position is achieved by rotating the knob 86 and valve body 88 ninety degrees counterclockwise as viewed in FIG. 1. That rotation disconnects the flow control valve outlet 109 and flow path 108 from the return path 112 illustrated in FIG. 4, and connects the control valve outlet 109 and flow path 108 with the cavity 116 as illustrated in FIG. 5. With the valve 54 in the dispense position, retracting the handle 30, thereby raising the plunger 24 in the cylinder 26 will pull a desired volume of fluid from the bottle 22 into the bottom of the cylinder 26 as has been previously described. Further, advancing the plunger 24 downwardly in cylinder 26 causes check valve 68 to close and check valve 102 in the flow control valve 54 to open in the same manner as described with respect to FIGS. 3 and 4. The liquid is pushed through the flow paths 58, 92, 94 and creates a higher pressure in path 94, thereby forcing the ball 98 away from the ball seat 96 and opening the check valve 102 as is illustrated in FIG. 5. With the check valve open, the liquid flows into cavity 104 through flow paths 106, 108 and out of the flow control valve outlet 109. Rotation of the flow control valve to the dispense position illustrated in FIG. 5 connects the outlet 109 with the cavity 116. Therefore, the liquid then is pushed along a dispensed path including flow path 117, through an internal flow path 118 in the dispensing tip 56, that extends from the cavity 116 to a dispensing orifice 120, thereby dispensing the liquid from the dispenser 20. Retracting the plunger 24 upwardly will allow the spring 100 to urge the ball 98 against the seat 96, thereby closing the valve 102 and terminating liquid flow through the orifice in the ball seat 96.

Referring to FIGS. 3 and 4, rotation of the flow control valve 54 from the illustrated recirculate to the dispense position rotates the flow path 108 and outlet 109 out of fluid communication with the return path 112. Further, outer surface of the valve body that is coextensive with the surface 132 and extends to the inner end 110 of the valve body 88 covers the upper end of the return path 112 and blocks liquid from flowing there through. Similarly, referring to FIG. 5, when the flow control valve is moved to the recirculate position, outer surface of the valve body that is coextensive with the surface 132 and extends to the inner end 110 of the valve body 88 covers the inlet to the cavity 116, thereby blocking liquid from flowing through the dispensing tip 56 and out the orifice 120.

In use, the dispenser is initially screwed onto or otherwise mounted on the top of the bottle, and the flow control valve is moved to the recirculate position of FIGS. 3 and 4. To purge air from the dispenser, the plunger 24 is successively retracted upward and advanced downward in the cylinder. With each retraction, the check valve 68 closes and check valve 102 opens; and air and some liquid is pulled from the bottle, through the fill tube 66, through the check valve 68, through the main fluid path 58 and into the cylinder 26. Further with each advancement of the plunger 24, the check valve 68 closes and check valve 102 opens. Air and liquid is then pushed through the flow path 58, through the check valve 102, through the control valve 54, through the external path 108 and outlet 109 and into the return path 112, thereby recirculating the air and liquid contained in the dispenser 20 back into the bottle 22. Preferably, at the end of the purge cycle, all of the fluid paths in the dispenser are filled with liquid and are purged completely of air.

Next the volume adjustment control 34 is moved vertically in the slot 36 to set the desired fluid volume to be dispensed, and the plunger 24 is then retracted upwardly which causes check valve 68 to open and check valve 102 to close. Liquid is pumped or pulled from the bottle, through the fill tube 66, through the check valve 68, through the main fluid path 58 and into the cylinder 26, thereby filling the cylinder with the desired volume of liquid.

The flow control valve 54 is then turned to the dispense position of FIG. 5, and the plunger is pushed into the cylinder causing the check valve 68 to close, check valve 102 to open. Liquid is then pumped or pushed through the flow path 58, through the check valve 102, through the control valve 54, through the external path 108 and outlet 109, into the cavity 116 and out the orifice 120 of the dispensing tip 56, thereby dispensing the desired volume of liquid.

The flow control valve of the present invention has several advantages. First, no liquid is dispensed during the air purge cycle. Second, if the dispenser is charged, that is, if the plunger is retracted to fill the cylinder with a desired volume of liquid, but it is determined that the volume was not properly set. Or, for some other reason, the liquid is not to be dispensed, the recirculate position of the control valve allows the liquid to be returned directly back into the bottle. Thereafter, the volume may be reset and a new dispensing cycle initiated. Third, when not in use, maintaining the flow control valve in its recirculate position eliminates the potential for an inadvertent or accidental dispensing of the liquid.

While the present invention has been illustrated by the description of the preferred embodiment, and while the preferred embodiment has been described in considerable detail, it is not the intention to restrict or in any way limit the scope of the appended claims to such detail. Additional advantages and modifications will readily appear to those who are skilled in the art. For example, referring to FIGS. 2 and 3, preferably the dispenser body 28 is comprised of an assembly of a number of individual components. A disk shaped component 134 is molded to contain the fluid paths 58, 78, 92 and 112 and the barbed tube fitting 76. The check ball 70 is inserted into the cavity 136 within the fluid path 58; and after the annular ball seat is assembled into the end of the fitting 64, the fitting is threaded into the lower end of the molded component 134 to form the check valve 68. The check ball 98 and spring 100 are inserted into the cavity 104 of the flow control valve body 88, and the annular ball seat is then inserted into a bore in the inner directed end of the body 88 to form the check valve 102.

The flow control valve is then assembled into the component 134 with the threaded nut 57; and the knob 86 is press fit onto the outer directed end of the body 88. The assembled component 134 contains the flow control valve 54, the two check valves 68,102 and all of the internal flow paths. The cylinder 26, tube adapter 21 and protective tube are assembled as previously described; and then the tube adapter 21 is mounted on top of the assembled component 134. That combined assembly is inserted into one of two housing component halves 138a, 138b; and then the two housing components are brought together. The assembled housing components 138a, 138b with the other components therein are then snapped into the swivel base 29. Thereafter, the fill tube is connected to the fitting 64; the fitting 122 is threaded in place; and the dispensing tip is then mounted on the fitting 122 to complete the assembly of the dispenser 20. As will be appreciated, the dispenser 20 may be constructed using other molded parts, components and assemblies.

In an alternative embodiment, the return tube instead of extending through the dispensing tip may be routed to intersect with the fill tube below the check valve. Thus, fluid is both sucked in and pushed out of the fill tube depending on whether the flow control valve is in the dispense or recirculate positions, respectively. (Add nos. and clean up.)

The invention, therefore, in its broadest aspects is not limited to the specific details shown and described. Consequently, departures may be made from the details described herein without departing from the spirit and scope of the claims which follow.

What is claimed is:

1. A dispenser adapted to be connected to a mouth of a container for dispensing a liquid from the container comprising:

a dispensing fluid path in fluid communication with a dispensing orifice, a return fluid path in fluid communication with the liquid in the container, and a cylinder having one end in fluid communication with the liquid in the container;

a plunger slidably mounted in the cylinder, whereby retracting the plunger in the cylinder moves the liquid from the container into the one ehd of the cylinder; and a flow control valve having a control valve fluid path providing fluid communication between the one end of the cylinder and a control valve outlet, the flow control valve being movable between a first position placing the control valve outlet in fluid communication with the dispensing path, whereby advancing the plunger in the cylinder moves the liquid from the one end of the cylinder and out the dispensing orifice, and a second position placing the control valve outlet in fluid communication with the return path, whereby advancing the plunger in the cylinder moves the liquid from the one end of the cylinder and back into the container;

a first check valve located in the control valve fluid path within the flow control valve, the first check valve permitting a flow of the liquid from the one end of the cylinder to the control valve outlet and preventing the flow of liquid from the control valve outlet back into the one end of the cylinder; and a second check valve disposed in the main passage near its one end, the second check valve permitting the liquid to flow from the container into the one end of the cylinder and preventing the liquid from flowing from the one end of the cylinder back into the container.

2. The dispenser of claim 1 wherein the flow control valve includes a valve body rotatably mounted therein, the valve body having a manually operable control knob on one end.

3. The dispenser of claim 2 wherein the manually operable control knob has an indicator pointing first, toward the dispensing orifice when the valve body is rotated to the first position and second, toward the container when the valve body is rotated to the second position.

4. The dispenser of claim 2 wherein the control valve fluid path includes a first fluid path in the valve body in fluid communication with the liquid in the container.

5. The dispenser of claim 4 wherein the first fluid path extends generally axially along a portion of the valve body.

6. The dispenser of claim 5 wherein the first fluid path is generally centrally located within the valve body.

7. The dispenser of claim 4 wherein the control valve fluid path includes a second fluid path in the valve body in fluid communication with the control valve outlet.

8. The dispenser of claim 7 wherein the second fluid path extends generally axially along a portion of the valve body.

9. The dispenser of claim 8 wherein the second fluid path extends along an outer surface of the valve body.

10. The dispenser of claim 7 wherein the control valve fluid path includes a third fluid path in the valve body interconnecting the first and the second fluid paths.

11. The dispenser of claim 10 wherein the third fluid path extends in a generally radial direction through the valve body between the first and the second fluid paths.

12. The dispenser of claim 4 wherein the first check valve is serially connected in the first fluid path.

13. The dispenser of claim 12 wherein the first check valve and the first fluid path are generally centrally and axially located with respect to the valve body.

14. The dispenser of claim 1 wherein the first check valve comprises:
   a check ball;
   a ball seat for receiving the check ball and forming a liquid tight seal there between; and
   a spring for biasing the check ball against the ball seat.

15. The dispenser of claim 1 wherein the flow control valve has only a single control valve outlet and only a single fluid path connected to the control valve outlet.

16. The dispenser of claim 1 further comprising a main fluid path extending through the dispenser body and providing fluid communication between the liquid in the container and the one end of the cylinder.

17. The dispenser of claim 2 wherein the main fluid path is generally axially and centrally located with respect to the dispenser body and the main fluid path is connected to the control valve fluid path.

18. The dispenser of claim 1 wherein the second check valve is located between the container and an intersection of the main fluid path with the control valve fluid path.

19. A liquid dispenser for dispensing liquids from a container having a mouth comprising:
   a dispenser body having
      a main passage extending there through,
      a dispensing orifice,
      a dispensing passage in fluid communication with the dispensing orifice,
      a return passage, and
      a cylinder having one open end connected to the dispenser body in fluid communication with one end of the main passage;
   a coupling connected to the dispenser body and encompassing another end of the main passage and one end of the return passage, the coupling adapted to be sealingly connected to the mouth of the container to place the other end of the main passage in fluid communication with the liquid;
   a plunger slidably mounted in the cylinder, whereby retracting of the plunger in the cylinder moves the liquid from the container, through the main passage and into the one end of the cylinder;
   a flow control valve mounted within the dispenser body and having
      a control valve fluid passage providing fluid communication between the one end of the cylinder and a control valve outlet, the flow control valve being movable between
         a first position placing the control valve outlet in fluid communication with an opposite end of the dispensing passage, whereby advancing the plunger in the cylinder moves the liquid from the one end of the cylinder and out the dispensing orifice,
         a second position placing the control valve outlet in fluid communication with an opposite end of the return passage, whereby advancing the plunger in the cylinder moves the liquid from the one end of the cylinder and back into the container, and
      a first check valve located within the control valve fluid passage, the first check valve permitting a flow of the liquid from the one end of the cylinder to the control valve outlet and preventing the flow of liquid from the control valve outlet back into the one end of the cylinder; and
   a second check valve located within the main passage near its opposite end, the second check valve permitting the liquid to flow from the container into the one end of the cylinder and preventing the liquid from flowing from the one end of the cylinder back into the container.

20. A liquid dispenser for dispensing liquid from a container comprising:
   a dispenser inlet;
   a dispenser outlet;
   a cylinder inlet/outlet;
   a control valve having a control valve inlet and a control valve outlet;
   an internal passage connecting the control valve inlet and the control valve outlet;
   a check valve in the internal passage permitting liquid flow only from the control valve inlet to the control valve outlet;
   a return path in fluid communication with the fluid in the container;
   the control valve being movable between a first position in which the control valve outlet connects to the return path to recirculate liquid back into the container in response to advancement of the plunger, and a second position in which the control valve outlet connects to the dispenser outlet to dispense liquid from the cylinder to the dispenser outlet in response to advancement of the plunger,
   a fluid withdrawal check valve in series with the dispenser inlet to permit liquid flow through the dispenser inlet only from the container.

21. A liquid dispenser for dispensing liquid from a container comprising:
   a dispenser inlet connectable with the liquid in the container, a dispenser outlet;
   a cylinder and plunger;
   a return path in fluid communication with the container interior,
   a fluid path interconnecting the cylinder, the control valve inlet and the dispenser inlet;

a control valve having
   a control valve inlet,
   a control valve outlet,
   an internal passage connecting the control valve inlet and the control valve outlet, and
   a first check valve in the internal passage permitting flow only from the control valve inlet to the control valve outlet,
the control valve being selectively movable between
   a first position to connect the control valve outlet to the dispenser outlet, and
   a second position to connect the control valve outlet to the return path; and
a second check valve mounted in the fluid path in series with the dispenser inlet to permit liquid flow in the fluid path only from the container interior.

22. A dispenser adapted to be connected to a mouth of a container for dispensing a liquid from the container comprising:
   a dispensing fluid path in fluid communication with a dispensing orifice,
   a return fluid path in fluid communication with the liquid in the container, and
   a cylinder having one end in fluid communication with the liquid in the container;
   a plunger slidably mounted in the cylinder, whereby retracting the plunger in the cylinder moves the liquid from the container into the one end of the cylinder; and
   a flow control valve having
      a valve body with a manually operable control knob on one end, and
      a control valve fluid path providing fluid communication between the one end of the cylinder and a control valve outlet, the control valve fluid path including
         a first fluid path in the valve body in fluid communication with the liquid in the container,
         a second fluid path in the valve body in fluid communication with the control valve outlet, and
         a third fluid path extending in a generally radial direction through the valve body between the first and second fluid paths,
   the flow control valve being movable between
      a first position placing the control valve outlet in fluid communication with the dispensing path, whereby advancing the plunger in the cylinder moves the liquid from the one end of the cylinder and out the dispensing orifice, and
      a second position placing the control valve outlet in fluid communication with the return path, whereby advancing the plunger in the cylinder moves the liquid from the one end of the cylinder and back into the container;
   a first check valve located in the control valve fluid path within the flow control valve, the first check valve permitting a flow of the liquid from the one end of the cylinder to the control valve outlet and preventing the flow of liquid from the control valve outlet back into the one end of the cylinder; and
   a second check valve disposed in the main passage near its one end, the second check valve permitting the liquid to flow from the container into the one end of the cylinder and preventing the liquid from flowing from the one end of the cylinder back into the container.

23. A dispenser adapted to be connected to a mouth of a container for dispensing a liquid from the container comprising:
   a dispenser housing having a generally radial bore;
   a dispensing tip mounted to the dispenser housing and having a dispensing orifice for dispensing the liquid from the container;
   a dispensing fluid path in fluid communication with the dispensing orifice,
   a return fluid path in fluid communication with the liquid in the container, and
   a cylinder mounted to the dispenser housing and having one end in fluid communication with the liquid in the container;
   a plunger slidably mounted in the cylinder, whereby retracting the plunger in the cylinder moves the liquid from the container into the one end of the cylinder; and
   a flow control valve mounted in the generally radial bore of the dispenser housing and having a control valve outlet and a control valve fluid path providing fluid communication between the one end of the cylinder and the control valve outlet, the flow control valve being movable between
      a first position placing the control valve outlet in fluid communication with the dispensing path, whereby advancing the plunger in the cylinder moves the liquid from the one end of the cylinder and out the dispensing orifice, and
      a second position placing the control valve outlet in fluid communication with the return path, whereby advancing the plunger in the cylinder moves the liquid from the one end of the cylinder and back into the container;
   a first check valve located in the control valve fluid path within the flow control valve, the first check valve permitting a flow of the liquid from the one end of the cylinder to the control valve outlet and preventing the flow of liquid from the control valve outlet back into the one end of the cylinder; and
   a second check valve disposed in the main passage near its one end, the second check valve permitting the liquid to flow from the container into the one end of the cylinder and preventing the liquid from flowing from the one end of the cylinder back into the container.

* * * * *